United States Patent
Zey et al.

[11] 3,745,751
[45] July 17, 1973

[54] SULFUR DIOXIDE COLLECTION SYSTEM

[75] Inventors: Aubrey F. Zey, Southgate; Julius V. Przygocki, Trenton; Philip Van Huffel, Detroit, all of Mich.

[73] Assignee: American Standard Inc., New York, N.Y.

[22] Filed: Oct. 26, 1970

[21] Appl. No.: 83,933

[52] U.S. Cl. ............... 55/122, 23/284, 55/DIG. 38, 55/135, 55/233, 55/242, 55/259, 55/349, 55/351, 204/313, 204/314, 204/322, 423/242, 423/522
[51] Int. Cl. ............................................. B03c 9/00
[58] Field of Search ........................ 55/2, 7, 8, 9, 10, 55/107, 122, 129, 130, 259, 349, 351, 135, 233, 242, DIG. 38; 23/25 Q, 284, 277 C; 21/74; 423/242, 522; 204/313, 314, 322

[56] References Cited
UNITED STATES PATENTS

| | | | |
|---|---|---|---|
| 2,841,242 | 7/1958 | Hall | 55/5 |
| 3,374,061 | 3/1968 | Topsoe et al. | 432/522 |
| 935,457 | 9/1909 | Bridge | 55/150 |
| 1,329,818 | 3/1920 | Wolcott | 55/8 |
| 1,368,560 | 2/1921 | Joseph | 204/322 |
| 2,357,354 | 9/1944 | Penney | 55/107 |
| 2,377,391 | 6/1945 | White | 55/2 |
| 2,926,999 | 3/1960 | Tarbutton et al. | 23/178 R |
| 3,227,429 | 1/1966 | Renzi | 261/112 |
| 3,526,081 | 9/1970 | Kusters | 23/277 C |

Primary Examiner—Bernard Nozick
Attorney—John E. McRae, Tennes I. Erstad and Robert G. Crooks

[57] ABSTRACT

A sulfur dioxide collection system comprising ozone-producing electrodes upstream from a baghouse, electrostatic precipitator, or scrubber, etc., whereby ozone is produced and simultaneously reacted with sulfur dioxide in the gas stream, thereby forming sulfur trioxide which is converted to sulfuric acid mist prior to or after entry into the conventional collector. The collection system removes the acid mist, (together with particulates, if any) from the flowing gas.

1 Claim, 7 Drawing Figures

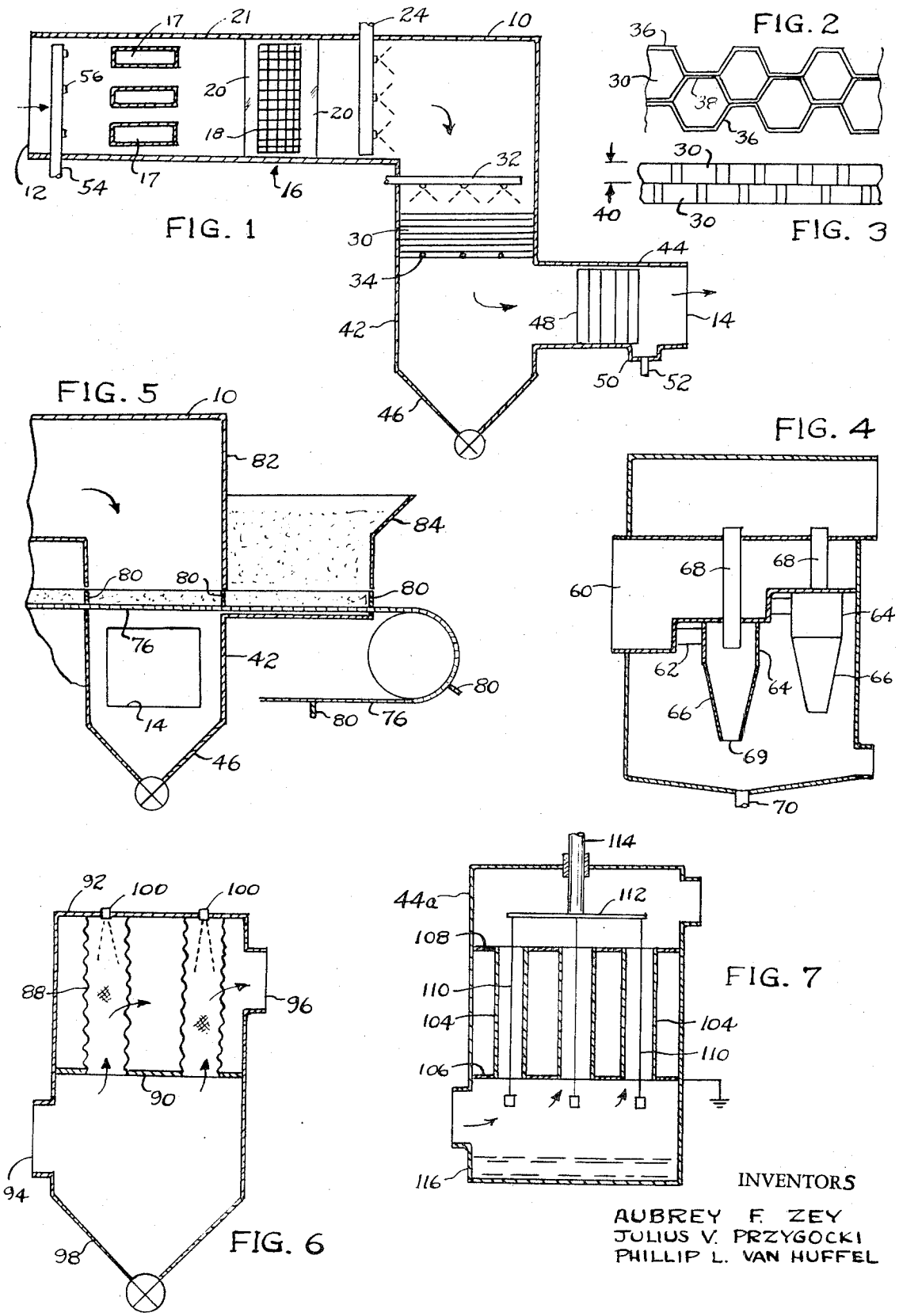

SULFUR DIOXIDE COLLECTION SYSTEM

THE DRAWINGS

FIG. 1 is a schematic illustration of a mechanism embodying the invention.

FIGS. 2 and 3 are views of cellular packing employed in the FIG. 1 mechanism.

FIGS. 4, 5, 6 and 7 are schematic representations of collector devices useful in the FIG. 1 mechanism.

FIG. 1

FIG. 1 elevationally shows a mechanism for removing gaseous sulfur dioxide and particulates from a stream of flowing hot gases, comprising a duct 10 having an inlet end 12 and an outlet end 14. The gases will be coming from the combustion zone of a coal-fired boiler, oil-fired boiler or other source which causes sulfur dioxide to be in the gas stream; particulates such as fly ash may or may not be in the stream admitted to inlet 12, depending on whether it is found desirable to provide a separate particulate removal means ahead of the illustrated mechanism. Usually the gas will contain some oxygen due to excess air being supplied to the combustion zone. Flow through the mechanism can be induced draft or forced draft, although in most instances the flow would be induced draft, as under common practice.

Positioned within the inlet end of the illustrated duct are ozone-producing electrodes 16 consisting of corona discharge wires in the form of vertical screens 18 and interposed grounded electrodes in the form of plates 20 (in the plane of the paper). Electrodes 20 may consist of spaced parallel plates suspended within the duct so that the gas flows through the spaces between the plates. The drawing illustrates one plate 20, but it will be understood that in practice several parallel plates are employed. The plates may be spaced apart several inches, for example 10 inches, and the discharge electrodes 18 arranged midway between adjacent sets of plates. Each set of discharge electrodes 18 may be electrically energized to a high negative potential, for example 50KV, by a transformer-rectifier (not shown) mounted on the roof 21 of the duct or elsewhere. The plates 20 are preferably grounded by their connections with the duct walls.

As the gases flow through the spaces between plate electrodes 20 oxygen in the gas is converted to ozone by the negative corona surrounding the corona discharge electrodes 18. Almost instantaneously the ozone reacts with sulfur dioxide in the gas stream to form sulfur trioxide. Plates 20 provide a voltage sink to make the corona process a continuous on-going process.

The FIG. 1 mechanism contemplates that the gases passing across electrodes 18 and 20 contain oxygen. In most cases the gas will contain enough oxygen to produce sufficient ozone for reaction with all of the sulfur dioxide in the gas stream; commonly the flue gases contain about 6% oxygen, which is sufficient. In event that the flue gases do not contain sufficient oxygen it is contemplated that additional oxygen can be added to the flue gas stream, as by means of oxygen lances or pipes 54 (FIG. 1) having one or more nozzles or ports 56. The oxygen may be pumped through pipes 54 by a suitable pump, not shown, either as pure oxygen or as a component in atmospheric air.

It is essential that the corona-producing electrodes 18 and 20 be located directly in the flue gas duct so that the duct gases wash over the electrode surfaces. With such an arrangement the sulfur dioxide in the gas stream is able to react with the corona-produced ozone immediately after the ozone is formed. The ozone-production process is a reversible process wherein the reaction rate from ozone to molecular oxygen is many million times faster than the reaction rate from molecular oxygen to ozone. If these reactants were allowed to remain in contact with each other molecular action would predominate greatly in the final mixture, and very little ozone would be formed. However, by continually passing flue gases, containing sulfur dioxide, over the ozone electrodes 18 and 20 the sulfur dioxide will compete with the oxygen for reaction with the ozone. The reaction rate of sulfur dioxide with ozone is much faster than the reaction rate for ozone back to molecular oxygen, and consequently the sulfur dioxide will use up substantially all of the ozone as it is formed without allowing the ozone to revert back to molecular oxygen.

Production of ozone is affected by temperatures of the reactant gases. If the gases are below about 250° F the amount of ozone produced is very small. At temperatures above 250° F the amount of produced ozone increases appreciably, therefore it is desired to carry out the process at temperatures well above 250° F. In event the gas temperature at inlet 12 is below a satisfactory level it is intended to artificially raise the temperature before it reaches apparatus 16. As shown in FIG. 1 the artificial heating may be accomplished by a heat exchanger having passages 17 going transversely through duct 10 at a point upstream of electrodes 16. Hot fluid (liquid or gas) flowing through passages 17 heats the duct 10 gas to a satisfactory temperature. Alternatively hot gas from any suitable source may be mixed into the duct 10 gas to raise its temperature.

The chemical reaction rate of the sulfur dioxide with ozone is governed to a certain extent by concentrations of ozone and sulfur dioxide in the flue gas stream. In most cases the sulfur dioxide concentration is very small, less than 1%, and the reaction rate is therefore much slower than would be the case if the sulfur dioxide were in a greater concentration. The concentration of ozone is highest near the surfaces of electrodes 18 and lowest near the surfaces of electrodes 20. By agitating the gas as it flows across the electrodes, as through baffles (not shown), it may be possible to artificially drive more of the oxygen molecules toward electrodes 20 and more of the sulfur dioxide molecules toward electrodes 18, thus promoting a higher average collision rate between the ozone and sulfur dioxide molecules. The effect of such agitation may be to permit a shorter ozone producer 16 (shorter in the direction of gas flow). Agitation of the stream may possibly be achieved by vibrating one or both sets of electrodes; other devices such as transverse air jets may also be practical.

Arranged downstream from the ozone-producing electrodes is a conventional mechanism 24 for introducing water vapor into the gas stream, whereby the sulfur trioxide is converted to sulfuric acid mist. As shown in the drawing, mechanism 24 comprises vertical pipes having ports or nozzles for spraying or discharging water into the duct. The injected water may be in the form of fine water droplets or vapor, whereby the dispersed water vapor droplets combine with gaseous sulfur trioxide to form sulfuric acid mist, which is subsequently removed from the gas stream in a collector 28.

Collector 28 is shown in FIG. 1 as a scrubber having a cellular packing 30 and overhead water spray nozzles 32. Water from nozzles 32 acts as a coolant for the gas stream to promote condensation of condensible gases as they enter packing 30; the water also acts as nucleii for agglomeration and gas-liquid mass transfer. Packing 30 preferably comprises horizontal layers of cellular material (for example 100 layers) supported on a horizontal wire grid 34 suitably attached to the duct side walls. As shown in FIG. 2, the cellular packing may be of honeycomb character, comprising sinuous strips of sheet material 36 having spaced portions 38 connected together, as by welding, adhesives, etc. The packing is preferably formed of very thin gauge sheets 36 so that the sharp edges of the sheets act as shearing surfaces on the water droplets coming from water spray nozzles 32.

The cell diameters may be on the order of ½ inch, and the thickness of each packing layer may be on the order of ¼ inch. The transverse duct 10 dimension is usually several feet, and the cellular packing is arranged in multiple layers transversely extending across the duct. Therefore the cell walls have very many shearing edges presented to the oncoming liquid droplets (for example several million edges). The multiple shearing edges in the lower layers are accomplished by randomly positioning one cellular layer on top of another such that the cells in adjacent layers are laterally offset from each other as shown in FIG. 3.

As the wetted gas flows downwardly through the packing 30 the shearing action on the liquid droplets produces a very fine fog which coats any particulates in the gas stream. This coating action increases the sizes of the particulates and produces an agglomeration of the particulates into larger size particles. As the gas containing the agglomerated particles turns from vertical duct section 42 into horizontal duct section 44 the agglomerated particulates are separated out of the stream by inertial separator action. The agglomerated particles and most of the fog are deposited in the hopper or sump 46, while the clean gas flows through a system of eliminator plates 48 disposed in duct section 44. Plates 48 may for example be constructed as shown in U.S. Pat. No. 3,338,035, whereby each plate has a series of vertical grooves which trap entrained liquid droplets and deliver same into a subjacent collection trough 50 having a drain pipe 52.

Packing 30 promotes transfer of gaseous sulfur trioxide into the liquid phase (sulfuric acid) in that it introduces turbulence to the gas-liquid streams. Such turbulence increases transverse random motions of the gas-liquid particles and thus increases the probability of particle collision necessary for transfer of sulfur trioxide into the liquid phase. The action is enhanced by the fact that the fog particles provide a very small spacing between liquid droplets so as to further increase the probability of collision between sulfur trioxide and water particles.

It is not believed essential that the final collector be a scrubber of the type shown in FIG. 1. For example, the final collector can take the form of a cyclone collector, as shown schematically in FIG. 4. The FIG. 4 collector has an inlet 60 that would in practice communicate with the duct section containing the ozone electrodes and water spray pipes 24 shown in FIG. 1. Flue gases (containing sulfuric acid mist, with or without entrained particulates) are admitted to inlet 60, from whence said gases flows through tangential passageways 62 leading to volute chambers 64. The component gas streams take cork screw motions around each volute chamber and the attached cone 66, whereby the clean gas is concentrated at the center of the cone, and the particulates and droplets are concentrated near the outer surface of the cone. Clean gases exit through central tubes 68; dust and liquid concentrates (with a small quantity of entraining gas) exit through the cone lower ends 69. Liquid sludge or acid may be withdrawn through a pipe 70, and the entraining air drawn through small opening 72. The illustrated cyclone collector shows two cyclones, but it will be appreciated that in practice many more cyclones would be employed.

FIG. 5 illustrates another form that the final removal means can take. As shown, the mechanism includes a bed 74 of filter material supported on a porous belt 76 suitably trained around a sprocket or drum 78. The belt can be provided with spaced upstanding walls or slats 80 which form continuations of the side walls 82 of duct 10 when belt 76 has been moved to a predetermined position by rotation of drum or sprocket 78.

Overlying the upper run of the belt is a hopper 84 adapted to contain filter bed material. Movement of drum 78 advances the belt leftwardly through suitable openings in the hopper side walls, to thereby form a filter bed in duct 10. This process is preferably accomplished on an intermittent basis, determined by gas velocity in duct 10 and the particulate-sulfur trioxide concentration in the gas stream. When the bed 74 is sufficiently contaminated the drum 78 may be rotated to discharge the bed material leftwardly out of the duct and form a new bed in the duct, as by advancement of the next slat 80 through hopper 84.

The bed 74 may be formed wholly or partly of granular material having the ability to chemically react with the sulfuric acid mist formed in the non-illustrated portion of the FIG. 4 duct. For example the bed may contain lime which is chemically reactive with sulfuric acid to form calcium sulphate.

It is believed that the bed material will remove not only the sulfuric acid mist but also particulate material, as by impingement processes within the pores of the bed granules. Water and/or some sludge may escape through the bed and deposit in sump 46, while clean gas escapes through an outlet opening 14 in the side wall of the duct.

FIG. 6 illustrates a usable final collector comprising a system of bags 88 loosely trained between a lower plate 90 and an upper plate or roof 92. Gas containing sulfuric acid mist, with or without particulates, is admitted to the collector through an inlet 94, from whence it passes upwardly into the individual bags, thence outwardly through the pores in the bags to a discharge chamber 96. The particulates and acid mist are trapped on the interior surfaces of the bag and are periodically or continuously washed downwardly into a sump 98 by overhead water sprays from nozzles 100.

FIG. 7 illustrates a mist collector that can be used in FIG. 1 as a substitute for the eliminator plates 48 and sump 50. The FIG. 7 duct section 44a would replace the FIG. 1 duct section 44.

Gas containing sulfuric acid mist would flow into chamber 102, thence upwardly through lead-lined pipes 104 mounted between tube sheets 106 and 108.

Each pipe contains a central corona discharge wire 110 suspended from an overhead frame 112 at the lower end of a central electrode 114 suitably insulated from duct 44a. Negative voltage, for example 50KV, is applied to electrode 114, thence to frame 112 and wires 110, thereby producing corona glow along the length of each wire. Liquid droplets flowing upwardly through pipes 104 are negatively ionized by wires 110 and collected on the inner surfaces of the grounded pipes. Liquid drains from the pipes into sump 116; droplet-free gas is exhausted through outlet 14a.

The present invention is concerned particularly with treatment of high temperature gases containing sulfur dioxide, and more particularly with a system of ozone-producing electrodes arranged in the gas duct so that hot gases directly wash the electrode surfaces, whereby corona discharge at the electrodes produces ozone which instantaneously reacts with sulfur dioxide in the gas stream to form sulfur trioxide. The sulfur trioxide is then hydrolized to sulfuric acid mist, which is then collected in suitable collectors, as shown for example in FIGS. 1, 4, 5, 6 and 7.

We claim:

1. Mechanism for removing sulfur dioxide from a stream of flowing flue gases, comprising a flow duct for gases; means causing the flue gases to contain appreciable quantities of molecular oxygen; ozone-producing electrodes arranged in the duct so that the oxygen-containing flue gases wash the electrode surfaces; means for maintaining the flue gases at temperatures well above 250° F. until after such gases have passed across the ozone-producing electrodes, whereby corona discharge at the electrode surfaces causes oxygen in stream to be converted to ozone, and whereby the ozone instantaneously reacts with sulfur dioxide in the gas stream to form sulfur trioxide; means downstream from the electrodes for introducing water vapor into the gas stream, whereby the sulfur trioxide is converted to sulfuric acid mist; and an electrostatic precipitator downstream from the water vapor introduction means for removing the sulfuric acid mist from the flowing stream.

* * * * *